United States Patent [19]

Nordberg

[11] 3,926,899

[45] Dec. 16, 1975

[54] PROCESS FOR PRODUCING NON-AQUEOUS POLYMER DISPERSIONS

[75] Inventor: Kurt Nordberg, Graz, Austria

[73] Assignee: Vianova-Kunstharz, A. G., Vienna, Austria

[22] Filed: July 17, 1973

[21] Appl. No.: 379,918

[30] Foreign Application Priority Data
July 26, 1972  Austria .............................. 6422/72

[52] U.S. Cl.... 260/33.4 R; 260/31.2 R; 260/32.8 R; 260/33.6 UA; 260/34.2; 260/884; 260/885
[51] Int. Cl.². C08K 5/01; C08K 5/05; C08L 27/00; C08L 31/02
[58] Field of Search...... 260/33.6 UA, 34.2, 29.1 R, 260/33.4 R, 884, 885

[56] References Cited
UNITED STATES PATENTS

| | | | |
|---|---|---|---|
| 3,317,635 | 2/1967 | Osmond | 260/881 |
| 3,505,268 | 4/1970 | Barkhouse | 260/31.2 |
| 3,514,500 | 4/1970 | Osmond | 260/874 |
| 3,607,821 | 8/1971 | Clarke | 260/34.2 |

Primary Examiner—Melvyn I. Marquis
Assistant Examiner—H. H. Fletcher
Attorney, Agent, or Firm—A. W. Breiner

[57] ABSTRACT

A process for producing non-aqueous acrylic dispersions in the presence of a stabilizer which is a reaction product of
 I. homopolymers of glycidyl(meth)acrylate with a molecular weight of from 10,000 to 50,000;
 II. (meth)acrylic acid chloride;
 III. acid chlorides of saturated fatty acids with 10 – 24 carbon atoms; and, optionally,
 IV. methyl- and/or ethyl(meth)acrylate,
and a polymerization initiator in an inert organic liquid is described. The dispersions due to their clarity and stability are highly satisfactory for use in protective coatings.

10 Claims, No Drawings

PROCESS FOR PRODUCING NON-AQUEOUS POLYMER DISPERSIONS

This invention relates to protective coatings and to processes for their manufacture. More particularly, this invention is concerned with a process for producing non-aqueous acrylic dispersions in inert organic liquids and in the presence of amphipatic macro-molecules.

It is known to produce polymer dispersions in a non-aqueous medium by polymerizing monomers or monomer blends in inert organic liquids in the presence of amphipatic macro-molecules. Amphipatic molecules, according to this specification, are molecules, one constituent of which is strongly solvated by an inert organic liquid, while the other constituent associates with dispersed polymer particles (a so-called anchor-component). Such compounds serve as stabilizers of non-aqueous dispersions. The inert organic liquids used as polymerization medium in such processes are preferably aliphatic hydrocarbons used as solvents in the paint industry under the generic definition "special white spirit" or "testing white spirit" or "paint white spirit." These "white spirits" have a boiling range of between 60° to 220°C. and normally contain some aromatic hydrocarbons. Besides the hydrocarbons, the organic liquids may include blends of such hydrocarbons with minor quantities of alcohols, or, optionally, esters, ketones, and other diluents or solvents used in the paint industry. It is an essential feature of the "inert organic liquids" that they should not dissolve the dispersed phase but should at the most cause a slight swelling of the polymer particles.

Various methods are known to produce amphipatic compounds. One way is to combine long chain compounds, solvated well by the organic liquid, with a linking compound having a constituent of different polarity, and which is not solvated or solvated only to a minimum extent, and which is similar in nature to the polymer to be stabilized, e.g., a self-polyester of 12-hydroxy stearic acid is reacted with glycidyl(methy)acrylate in order to introduce a polymerizable double bond, and methyl(meth)acrylate is grafted there onto to obtain an amphipatic stabilizer suitable for stabilizing a dispersion mainly consisting of polymethyl(meth)acrylate (British Pat. No. 1,122,397). As used herein, "(meth)" followed by acrylate or acrylic acid is the shortened way of enumerating acrylic and methacrylic derivatives. Thus, "(meth)acrylic acid" is used to enumerate acrylic acid and methacrylic acid. Note U.S. Pat. Nos. 3,514,500 and 3,707,584 for similar usage. The stabilizer itself can be produced during the polymerization, i.e., through the presence of a polymeric precursor which may, as is described above, be an addition compound of a self-polyester of 12-hydroxy stearic acid and glycidyl(meth)acrylate, with which a part of the added monomers react with the formation of a block polymer or graft polymer (British Pat. No. 1,259,516). Furthermore, it is possible to produce a so-called backbone by polymerization, polycondensation or polyaddition, which carries functional groups and to react part of these with long chain compounds which are strongly solvated, and to react the other part with monomers, the double bonds of which remain intact during the reaction. The resulting compound is polymerized with the monomer which forms the dispersed polymer. In another method, the strongly solvated components of the amphipatic molecule are built into the polymer when the backbone is produced, i.e., by copolymerizing long chain polymerizable compounds which are solvated by the organic liquid, with alpha, beta-ethylenically unsaturated compounds carrying functional groups which serve as linking sites for the anchor component (British Pat. No. 1,095,288).

The present invention is concerned with an improved process for producing non-aqueous acrylic dispersions which is characterized in that the acrylic monomers, optionally in conjunction with subordinate proportions of other alpha, beta-ethylenically unsaturated monomers, are polymerized in the presence of a stabilizer which is a reaction product of I. homopolymers of glycidyl(meth)acrylate with a molecular weight of from 10,000 to 50,000;
II. (meth)acrylic acid chloride;
III. acid chlorides of saturated fatty acids with 10 – 24 carbon atoms; and, optionally,
IV. methyl- and/or ethyl(meth)acrylate, in inert organic liquids, preferably aliphatic hydrocarbons, in the presence of polymerization initiators, and optionally chain transfer agents, at elevated temperature, preferably at reflux. The ratio between components II and III of the stabilizer may range between 0.5 – 8 mol-percent, to 99.5 – 92 mol-percent, preferably between 2 – 4 mol-percent to 98 – 96 mol-percent. The dispersions are produced in the presence of 4 – 15 percent by weight, preferably 7 – 10 percent by weight, of stabilizer, calculated on the total monomers of the polymer dispersion. Suitable inert organic liquids are aliphatic hydrocarbons with a boiling range of from 60° – 210°C., optionally co-employing minor proportions of aromatic hydrocarbons, and/or alcohols, preferably white spirit with a boiling range of from 80° to 120°C.

It is possible to react polymers with glycidyl groups in the backbone with corresponding carboxylic acids; however, the reaction is very slow and incomplete, even when using catalysts. The disadvantages of this method are extremely long reaction times and, thus, dark brown reaction products, poor reproducibility, and the impurities due to the incomplete reaction of the starting materials, which adversely influence the performance of the films produced from the non-aqueous dispersions. Through the use of acid chlorides instead of the free (meth)acrylic acid or free fatty acids, the aforesaid disadvantages are avoided. The reaction of the acid chlorides with the epoxy groups leads to a 99 – 100 percent conversion after relatively short periods of reaction. This quantitative conversion of the reaction partners guarantees the production of pale, uniform, and entirely reproducible products, free from undesired by-products, since plasticizing proportions of unreacted fatty acids or white spirit insoluble homopolymers of (meth)acrylic acid are not present. Dispersions produced with these stabilizers of the present invention, thus, show excellent stability and the films obtained from the dispersions have a particular clarity.

A further outstanding advantage of the stabilizer of the invention is the fact that the non-aqueous dispersions produced therewith can be rapidly and completely redispersed. If, for example — and this proved particularly favorable — the non-aqueous dispersions are produced in a low-boiling inert organic liquid, and the liquid is simply distilled off under reduced pressure, the remaining dry substance can be ground to a fine powder which can be redispersed, e.g., in an inert organic medium particularly suitable for the paint industry, by simply rapidly stirring without need for additives. Contrary to normal dispersions, the powders have the advantage of practically infinite stability on storage, as well as a most simplified handling on packing, transport, and storage. The liquid can also be removed by spray drying or other known methods.

The invention is illustrated by the following examples, in which all parts relate to parts by weight. In these examples the following aliphatic hydrocarbons are used:

|  | Boiling Range °C. | Aniline Point °C. | Kauri-Butanol Value, Abt. | Percent by Volume Content of Aromatic Hydrocarbons |
|---|---|---|---|---|
| White spirit | 80 – 120 | 60 | 36 | 2.5 |
| White spirit A | 150 – 190 | 56 | 39 | 18 |
| White spirit B | 180 – 210 | 62 | 37 | 18 |
| White spirit C | 180 – 210 | 85 | 26 | 0 |

Suitable monomers for producing the dispersed polymer are: methyl(meth)acrylate, ethyl(meth)acrylate, propyl(meth)acrylate, butyl(meth)acrylate, hydroxyethyl(meth)acrylate, glycidyl(meth)acrylate, N-tertiarybutylaminoethyl(meth)acrylate, (meth)acrylic acid. Besides these acrylic monomers, subordinate proportions of other alpha, beta-ethylenically unsaturated monomers can be co-employed to produce the dispersed phase, such as styrol, vinyl esters of carboxylic acids with 1 – 5 carbon atoms, vinyl esters of tertiary carboxylic acids with up to 11 carbon atoms, maleic acid, fumaric acid, or itaconic acid. Subordinate proportions herein means less than 49 percent.

The dispersions of the invention are particularly valuable as film-forming components and can be blended in known manner with pigments, soluble dyes, cross-linking agents, plasticizers, etc., and are used as coating compositions. The stabilizers can be produced by various methods, exemplified by the following method: Glycidyl(meth)acrylate, solvent, e.g., ethyl glycol acetate, initiators and chain transfer agent are mixed. One-third of the blend is charged to a reaction vessel equipped with stirrer, reflux condensor, thermometer, and charging vessel. An inert gas charge is applied and the charge heated to reflux temperature. The remainder of the blend is charged continuously from the charging vessel over a period of one to three hours. In order to introduce white spirit soluble side chains and polymerizable double bonds, component II and III are added to the homopolymer continuously over a period of about five hours at about 120° – 130°C., and the batch is held at reaction temperature for about 2 additional hours to achieve complete conversion. The obtained solution of stabilizer is either used as such or is optionally reacted with component IV, i.e., methyl- and/or ethyl(meth)acrylate. The reaction with component IV, if elected, is carried out at 120°C. for 2 hours. Thereafter, the stabilizer is freed from the ester solvent and is dissolved in white spirits.

For producing the dispersions of the invention, any normal method can be used, e.g., the stabilizer is charged to a reaction vessel first, either partly or completely, together with the inert organic liquid. An inert gas is charged. The monomer blend alone or with the remainder of the stabilizer and initiators and chain transfer agent, if used, are added. Other methods also are suitable, e.g., charging a portion of the monomers with the total quantity of stabilizer or a portion thereof, and adding the remainder, or charging at once the whole blend of organic liquid, stabilizer, monomers, initiator, chain transfer agent, etc. The polymerization takes about one to three hours, preferably one to one and one-half hours, at a temperature of from 60° – 100°C. The dispersions can be produced with a solids content of 50 percent or more.

PREPARATION OF STABILIZER A

Step 1: The following components are charged to a reaction vessel equipped with stirrer, reflux condensor, charging vessel, and thermometer:

| | |
|---|---|
| glycidyl methacrylate | 50 parts |
| azobisisobutyronitrile | 1 part |
| tert. dodecylmercaptan | 1 part |
| ethyl glycol acetate (monoethyleneglycolmonoethylether acetate) | 97 parts |

The reaction blend is covered with $N_2$ gas and heated to reflux temperature (about 120°C.). In the course of three hours, a blend consisting of 100 parts of glycidyl methacrylate, 2 parts of azobisisobutyronitrile, 2 parts of tert. dodecylmerkaptane, and 200 parts of ethylglycolacetate is added and the batch is kept at reflux temperature for an additional 2 hours.

Step 2: The backbone of polyglycidyl methacrylate thus formed is modified as follows to introduce white spirit compatible side chains: 200 parts of Step 1 are heated to about 120°C. and in the course of 5 hours, a blend of 1.21 parts of methacrylic acid chloride; 137.2 parts of stearic acid chloride; 1.38 parts of triethylamine, and 138 parts of ethylglycol acetate is added and the temperature is held at about 130°C. for another 2 hours.

Step 3: The solution of the stabilizer is freed from the solvent by evaporation in vacuum and is dissolved to a solids content of 30 % with white spirit.

PREPARATION OF STABILIZER B

To 110 parts of the product obtained in Step 2 of Stabilizer A, prior to distillation of the solvent, 20.8 parts methyl methacrylate, 20.8 parts of ethylglycol acetate, and 0.2 parts of azobisisobutyronitrile are added at 120°C. and the batch is held at reflux at 120°C. for 2 hours. The solvent is distilled off with reduced pressure and is replaced by white spirit (solids content = 33.4 percent).

PREPARATION OF STABILIZER C

Step 1: 200 parts of the polyglycidyl methacrylate solution of Step 1 of Stabilizer A are charged to a reaction vessel equipped with stirrer, reflux condensor, and addition funnel, and are heated to about 120°C. In the course of five hours a blend of 98.9 parts of ethylglycol acetate, 96.5 parts of lauric acid chloride, 2.42 parts of methacrylic acid chloride, and 0.98 parts of triethylamine is added. The temperature is raised to 130°C. and is held for another 2 hours.

Step 2: 42 parts of methyl methacrylate, 42 parts of ethylglycol acetate, and 0.42 parts of azobisisobutyronitrile are added at 120°C. to 95 parts of the product obtained in Step 1. The batch is held at 120°C. for 2 hours. The solvent is distilled off with reduced pressure and the polymer is diluted to a solids content of 13.8 percent with white spirit.

EXAMPLE 1

The preparation of a dispersion of 50 percent solids content of polymethyl methacrylate in an inert organic liquid is as follows: A blend of 29.9 parts of stabilizer B and 91.1 parts of white spirit is charged to a reaction vessel equipped with reflux condensor and stirrer and is heated to reflux temperature (about 87°C.) and, in the course of 1 hour, a blend of 100 parts of methyl methacrylate and 1 part of azobisisobutyronitrile is added, $N_2$ gas being charged. The reflux temperature is held for another hour. A stable dispersion without residues is obtained which shows excellent performance as a paint.

Preparation of a redispersible polymer powder is as follows: The solvent is removed under vacuum at 30° - 40°C. and the dry residue is ground to a fine powder.

With a high speed stirrer the powder is redispersed in white spirit A and a 50 percent polymer dispersion is produced. The dispersion is stable and shows excellent performance as a paint.

EXAMPLE 2

The preparation of a 50 percent dispersion of poly(-methylmethacrylate/ethylacrylate/acrylic acid) in an inert organic liquid is as follows: A blend of 29.9 parts of stabilizer B and 91.1 parts of white spirit is heated to reflux temperature (about 87°C.) in a reaction vessel equipped with reflux condensor and stirrer. In the course of one hour, and under $N_2$-atmosphere, a blend of 73 parts of methyl methacrylate, 25 parts of ethyl acrylate, 2 parts acrylic acid, and 1 part of azobisisobutyronitrile is added. The reflux temperature is held for another hour. A stable dispersion without residues is obtained.

The obtained polymer dispersion is dried by distilling off the inert organic liquid. The residue is ground to a fine powder and converted to a stable dispersion of 50 percent solids by adding a blend of white spirit C, white spirit, and butanol in the ratio of 7 : 2 : 1.

EXAMPLE 3

The preparation of a cross-linking dispersion consisting of poly(methylmethacrylate/hydroxyethylmethacrylate/acrylic acid) is as follows: A blend of 2 parts of stabilizer A, 4 parts of methylmethacrylate, 0.1 parts of azobisisobutyronitrile and 87.6 parts of white spirit is charged to a reaction vessel equipped with reflux condensor and stirrer and is heated to reflux temperature (about 87°C.) and held at this temperature for 15 minutes. Then, in the course of one hour, a blend of 31.4 parts of stabilizer A, 84 parts of methylmethacrylate, 10 parts of hydroxyethylmethacrylate, 2 parts of acrylic acid, and 0.9 parts of azobisisobutyronitrile is added and the batch is held at 87°C. for 1 hour. A stable dispersion without residues is obtained.

The polymer dispersion is dried by freeing it from the organic liquid by distillation. The residue is ground to a fine powder and a stable dispersion of 50 percent solids content is produced by adding white spirit C and dispersing with a highspeed stirrer.

The initially produced dispersion as well as the redispersed dispersion show excellent storage stability.

The dispersions of Example 3 can be cross-linked with a suitable cross-linking agent, e.g., a melamine formaldehyde resin, at elevated temperature.

EXAMPLE 4

The preparation of a 50 percent solids dispersion of poly(methylmethacrylate/ethylacrylate/acrylic acid) in an inert organic liquid is as follows: A blend of 72.5 parts of stabilizer C and 91.1 parts of white spirit is charged to a reaction vessel equipped with reflux condensor and stirrer and is heated to reflux temperature (about 87°C.). In the course of one hour, a blend consisting of 73 parts of methylmethacrylate, 25 parts of ethylacrylate, 2 parts of acrylic acid, and 1 part of azobisisobutyronitrile is added continuously, with $N_2$ gas. The reflux temperature is held for another hour. A stable dispersion without residues is obtained.

EXAMPLE 5

The preparation of a cross-linkable dispersion of poly(methylmethacrylate/ethylacrylate/hydroxyethyl-methacrylate/styrol/acrylic acid) in an inert organic liquid is as follows: A blend of

| | |
|---|---|
| stabilizer A | 16 parts |
| methylmethacrylate | 40 parts |
| styrol | 10 parts |
| ethylacrylate | 6 parts |
| acrylic acid | 1.4 parts |
| hydroxyethylmethacrylate | 10 parts |
| azobisisobutyronitrile | 0.6 parts |
| white spirit A | 881 parts | is charged to a reaction vessel equipped with stirrer and reflux condensor and heated to 90°C., under $N_2$ gas, and held at 90°C. for 20 minutes. The following blend of

| | |
|---|---|
| stabilizer A | 263 parts |
| methylmethacrylate | 544 parts |
| styrol | 136 parts |
| hydroxyethylmethacrylate | 140 parts |
| ethylacrylate | 94 parts |
| acrylic acid | 19 parts |
| azobisisobutyronitrile | 9.4 parts | is added in the course of 1 hour and the reaction temperature of 90°C. is held for another hour. A stable dispersion with 50 percent solids content and without any residues is obtained, and can be cross-linked at elevated temperature with a suitable cross-linking agent.

The dispersions of Examples 1 – 5 are excellent for use in protective coatings of various types, either with or without pigments, etc.

As will be apparent to one skilled in the art, the descriptive matter is to be interpreted as merely illustrative of the principles of the invention rather than as limiting the invention. It is contemplated that various changes and modifications may be made within the ability of one skilled in the art to achieve like results without departing from the spirit of the invention or the scope of the appended claims.

I claim:

1. Process for producing non-aqueous acrylic dispersions from monomers of acrylic or methacrylic acid, or a mixture of said acrylic monomers and subordinate amounts of other alpha, beta-ethylenically unsaturated monomers in organic liquids, in the presence of stabilizers, characterized in that the said monomers are polymerized in the presence of from about 4 – 15 percent by weight, based on the total monomer weight of the dispersion of a stabilizer which is a reaction product of I. homopolymers of glycidyl(meth)acrylate with a molecular weight of from 10,000 to 50,000;

II. 0.5 – 8 mol percent acrylic acid chloride or methacrylic acid chloride per mol of each glycidyl group of I;

III. 92 – 99.5 mol percent of chlorides of saturated fatty acids with 10 – 24 carbon atoms per mol of each glycidyl group of I;

said polymerization occurring in inert organic liquid comprising aliphatic hydrocarbons with a boiling range of from 60° – 210°C., and in the presence of polymerization initiators.

2. Process according to claim 1, characterized in that the mol percent of II is from about 2 – 4 mol percent and the mol percent of III is from about 96 – 98 mol percent.

3. Process according to claim 2, characterized in that said stabilizer is present at from about 7 – 10 percent by weight.

4. Process according to claim 3, characterized in that the inert organic liquid includes minor amounts of aromatic hydrocarbons and/or alcohols.

5. Process according to claim 3, characterized in that the inert organic liquid has a boiling range of from 80° to 120°C.

6. Process according to claim 1, wherein the process occurs in the presence of a chain transfer agent.

7. Process according to claim 1, wherein the temperature of the reaction is the reflux temperature.

8. Process according to claim 1, characterized in that the dispersion is dried at temperatures below 50°C. to provide a polymer powder.

9. Process according to claim 3, characterized in that the dispersion is dried at temperatures below 50°C. to provide a polymer powder.

10. Process according to claim 9, wherein the powder is redispersed in an organic liquid.

* * * * *